United States Patent [19]
Horlein et al.

[11] 3,890,344
[45] June 17, 1975

[54] 2-HALOALKYL-HALOALKYLSULFONYL-BENZIMIDAZOLES

[75] Inventors: Gerhard Horlein, Frankfurt am Main; Adolf Studeneer, Kelkheim, Taunus; Peter Langeluddeke, Diedenbergen, Taunus; Friedhelm Schwerdtle, Kelkheim, Taunus, all of Germany

[73] Assignee: Hoechst Aktiengesellschaft, Frankfurt am Main, Germany

[22] Filed: May 23, 1974

[21] Appl. No.: 472,800

[30] Foreign Application Priority Data
May 25, 1973   Germany.............................. 2326624

[52] U.S. Cl. ................. 260/309.2; 71/92; 260/578
[51] Int. Cl. ........................................ C07d 49/38
[58] Field of Search ................................ 260/309.2

[56] References Cited
UNITED STATES PATENTS
3,412,101   11/1968   Zwahlen .......................... 260/309.2
3,673,209   6/1972   Frick................................. 260/309.2

OTHER PUBLICATIONS
Bannert, et al., Chem. Abst., 1973, Vol. 78, No. 99066w, QD1.A51.

Sedova, et al., Chem. Abst., 1970, Vol. 72, No. 31366q, QD1.A51.

Troitskaya, et al., Chem. Abst., 1973, Vol. 79, No. 54858k, QD1.A51.

Yagupol'skii, et al., Chem. Abst., 1959, Vol. 53, columns 21765–217656, QD1.A51.

Primary Examiner—Natalie Trousof
Attorney, Agent, or Firm—Curtis, Morris and Safford

[57] ABSTRACT

Compounds of formula

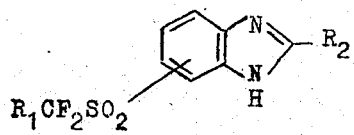

in which $R_1$ is hydrogen, $-CF_2H$, $-CFClH$ or $-CCl_2H$ and $R_2$ is $(C_{1-2})$ halogenalkyl, are valuable herbicides.

2 Claims, No Drawings

2-HALOALKYL-HALOALKYLSULFONYLBENZIMIDAZOLES

The herbicidal action of numerous benzimidazoles substituted in 2-position by haloalkyl is known (Dutch Pat. application No. 6 700 130; Belgian Pats. Nos. 659 384 and 697 288; Z. Naturforsch. Part B, 25 (1970), 934–944).

The present invention relates to benzimidazole derivatives of the formula

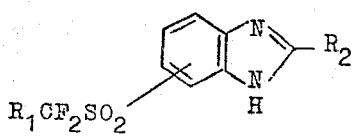  I where $R_1$ is H, $-CF_2H$, $-CFClH$ or $-CCl_2H$ and $R_2$ is haloalkyl having 1 or 2 carbon atoms.

The present invention relates furthermore to a process for the preparation of compounds of formula I, which comprises reacting o-phenylenediamine derivatives of the formula

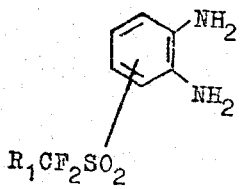  II with aliphatic halocarboxylic acids of the formula $$R_2-COOH$$

  III or the functional derivatives thereof.

The reaction of the compounds of formula II to form the compounds of the invention is carried out in known manner by reacting an o-phenylene-diamine derivative II with a halocarboxylic acid III or a functional derivative thereof. Such functional derivatives are for example esters of halocarboxylic acids with lower alcohols, furthermore anhydrides, acid halides, especially acid chlorides, imino ethers or amidines. In these compounds, $R_2$ may for example stand for the following radicals: $-CF_3$, $-CCl_3$, $-CBr_3$, $-CHCL_2$, $-CH_2Cl$, $-CF_2CF_3$, $-CCl_2CCl_3$, $-CCl_2CH_3$, $-CHClCH_3$, $-CF_2CCl_2H$.

The use of an inert solvent, preferably glacial acetic acid, is generally advantageous; however, when the free acids are employed, an excess of from 50 to 100 % of free acid over the theory is sufficient. Depending on the reactivity of the reactants, the reaction temperatures are in the range of from 40° to 120°C; the operations being preferably carried out at the reflux temperature of the reaction mixture. After completion of the reaction the solvent or the excess of component III is distilled off advantageously together with the water formed. The reaction products remain as solid residues which, optionally, may be purified by recrystallization.

The compounds of formula I have an excellent selective herbicidal activity, especially in hard-to-combat dicotyledonous weeds, and they may therefore be applied as herbicides in combination with usual formulating additives such as adhesives, wetting and dispersing agents, liquid or solid carrier materials, grinding auxiliaries, or granulating agents. Other herbicidal agents and/or fertilizers may also be added.

The starting substances of formula II may be obtained according to known methods, starting from 2- or 4-chloro-mercaptophenol (see also Example 1a and 2f) according to the following scheme:

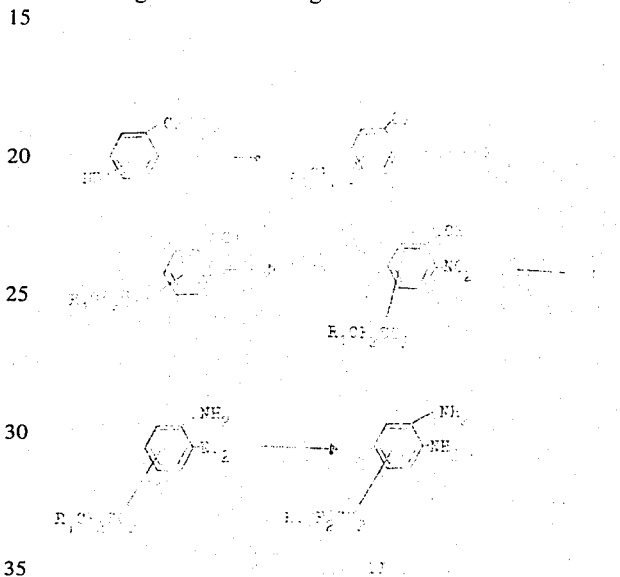

The novel compounds of formula I may be applied to a great number of crop plants such as cereals, potatoes, cotton or peanut, before or after the emergence of the plants, in order to combat weeds. For example, in cereals they effectively control deadnettle (Lamium), field speedwell (Veronica), goose grass (Galium), corn pansy (Viola), knotgrass (Polygonum) and ox-eye daisy (Chrysanthemum) in post-emergence application. In potatoes, cotton and peanut they are usually applied in the pre-emergent phase. The compounds may furthermore be used to combat broad-leaf weeds in lawns.

The compounds are well tolerated by crop plants. They have an activity superior to that of known commercial products having a similar application range, for example bromofenoxim (3,5-dibromo-4-hydroxybenzaldoxime-0-2', 4'-dinitrophenol ether) or dinoseb (2,4-dinitro-6-sec-butylphenol); as compared to products of the group of the yellow spraying agents (for example 3,5-dinitro-o-cresol or dinoseb) they have the advantage of not dyeing the plants.

The herbicides of the invention may be present in commercial formulations of plant protecting products in varying concentrations. Depending on the specific mode of formulation they may contain from 10 to 80 % of active substance. When mixed with other active substances and/or fertilizers, the content of active substance may be decreased and amount for example to 1 % or less.

The products are applied in dilution rates usual for herbicides, which rates depend on the weeds to combat, the crop plants to be spared, the climatic conditions, the season, the nature of the soil and other factors. In practice, dilutions of from about 0.001 to 1.0 % are usual in the open field. As comparative value, the part by weight applied per surface unit of soil (kg/ha or lbs/acre) is often indicated.

The compounds may be applied in the form of wettable powders, emulsifiable concentrates, dusting powders or granules, alone, or optionally, in combination with other herbicides, soil insecticides or also with fertilizers.

Wettable powders are preparations which are homogeneously dispersible in water, and which, in addition to the active substance and an inert substance, contain also wetting agents, for example polyoxethylated alkylphenols, polyoxethylated oleyl or stearyl amines, or alkyl or alkylphenyl-sulfonates, and dispersing agents, for example the sodium salts of lignin-sulfonic acid, 2,-2'-dinaphthyl-methane-6,6'-disulfonic acid, dibutylnaphthalene-sulfonic acid, or oleylmethyltaurine.

Emulsifiable concentrates may be obtained by dissolving the active ingredient in an organic solvent, for example butanol, cyclo-hexanone, dimethyl formamide, xylene, or higher boiling aromatics. In order to obtain a good emulsion in water, further wetting agents from the above series may be added.

Dusting powders are obtained by grinding the active substance with finely divided solid substances, for example talcum or natural aluminates, pyrophyllite or diatomaceous earth.

Granules may be obtained either by atomizing the active substance through a nozzle onto an absorptive granulated inert material, or by applying a concentrate of the active ingredient by means of an adhesive, for example polyvinyl alcohol, the sodium salt of polyacrylic acid or mineral oils, onto the surface of granulated inert materials. The active substances may also be granulated by the methods used in the preparation of fertilizer granulated material, if desired in admixture with one or more fertilizers.

The following Examples illustrate the invention.

EXAMPLE 1 a. 4-difluoro-methylthio-1-chlorobenzene

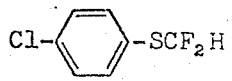

4000 ml of 1,2-dimethoxy-ethane were added to a sodium-4-chloro-thiophenolate solution, prepared by dissolving 2075 g (51.8 moles) of caustic soda in 2300 g of water and adding 1500 g (10.4 moles) of 4-chlorothiophenol. The resulting mixture was heated to 68° – 70°C, and subsequently 1400 g (16.7 moles) of gaseous difluoro-chloromethane were introduced into the solution with intense agitation. After the indicated amount of $CHClF_2$ was added the reaction mixture was cooled to room temperature and separated from precipitated inorganic salts by suction-filtration. The filtrate was then separated into an organic and an aqueous phase. A methylene chloride extract of the aqueous phase was added to the organic phase, the whole was washed with water, dried and finally concentrated in vacuo. After elimination of the methylene chloride and the residual 1,2-dimethoxy-ethane, the residue was vacuum-distilled.

The yield was 1870 g (92 %, relative to the 4-chlorothiophenol used) of 4-difluoro-methylthio-1-chlorobenzene.

Boiling point: 94° – 96°C (16 – 17 mm)
(lit.:) 62° – 64°C (0.3 mm) 80 % b. 4-(1',1',2'-trifluoro-2'-chloroethylthio)-1-chlorobenzene

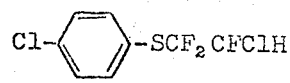

97 g (1.7 moles) of pulverized caustic potash were added to a solution of 498 g (3.4 moles) of 4-chlorothiophenol in 800 ml of acetonitrile. Subsequently, at a maximum temperature of 60°C, 101 g (3.4 moles) of trifluoro-chloroethylene were introduced with agitation into the mixture formed. After the gas had been introduced, the reaction mixture was maintained at 60°C for another hour.

The potassium hydroxide precipitated from the cooled reaction mixture was separated by suction-filtration, and water was added to the filtrate until the thioether formed precipitated in the form of an oil, which was separated from the aqueous phase by extraction with methylene chloride. The methylene chloride phase was washed, dried and concentrated. The residue consisted of 683 g of an oil, from which the pure product was obtained by vacuum distillation.

The net yield was 625 g (69.8 %, relative to the 4-chlorothiophenol used) of 4-(1',1',2'-trifluoro-2'-chloroethylthio)-chlorobenzene.

Boiling point: 94° –96°C (1.5 – 1.6 mm)

c. 4-difluoro-methylsulfonyl-1-chlorobenzene

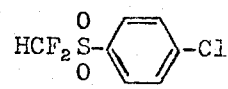

1750 g of 33 % aqueous hydrogen peroxide solution were added dropwise with agitation to a solution of 1000 g (5.14 moles) of 4-difluoro-methylthio-1-chlorobenzene in 3500 ml of glacial acetic acid preheated to an internal temperature of 100°C in such a manner that the reaction temperature was maintained without additional heating. Agitation was continued for another hour at 100°C. Subsequently, the reaction mixture was cooled to room temperature and stirred into a mixture of ice and water. The crude precipitate was collected on a suction filter, washed to neutral with large amounts of water and dried by suction. It was then purified by dissolving in boiling benzene, separation of the water still adhering, cooling of the benzene solution and suction-filtration of the precipitated crystals.

1078 g (92.6 %, relative to the thio ether amount used) of 4-difluoro-methylsulfonyl-1-chlorobenzene were obtained. Melting point: 67° – 68°C (lit.: 67°C).

d. 4-difluoro-methylsulfonyl-2-nitro-1-chlorobenzene

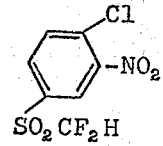

214 ml of fuming nitric acid were added dropwise with agitation to a solution of 683 g (3.0 moles) of 4-difluoromethylsulfonyl-1-chlorobenzene in 1850 ml of concentrated sulfuric acid at a temperature of from 70° to 80°C. The mixture was maintained at this temperature for 1 hour. After cooling to room temperature, the mixture was introduced into ice/water, the crude precipitate was decanted several times with water, washed to neutral on a suction filter and finally recrystallized from methanol. 777 g (94.5 %) of 4-difluoromethylsulfonyl-2-nitro-1-chlorobenzene were obtained.

Melting point 72° – 74°C e. 4-difluoro-methylsulfonyl-2-nitro-1-aminobenzene

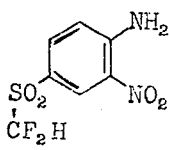

A solution of 100 g (3.7 moles) of 4-difluoromethylsulfonyl-2-nitro-1-chlorobenzene in 4000 ml of 99 % ethanol in an autoclave was saturated with gaseous ammonia at a pressure of 7 atm/g, and heated for 10 hours at about 60° – 70°C. After cooling to room temperature and release of the pressure, the contents of the pressure vessel were introduced into the 10-fold amount of water, the crude precipitate was collected on a suction-filter and crystallized from ethanol. 846 g (91 %) of 4-difluoro-methylsulfonyl-2-nitro-1-aminobenzene were obtained which, according to the thin-layer chromatogram, were free from starting product.

Melting point 168° – 169°C f. 4-difluoro-methylsulfonyl-1,2-diaminobenzene

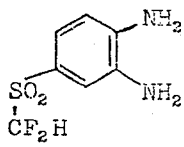

20 g of a nickel catalyst on kieselguhr were added to a solution of 400 g (1.6 moles) of 4-difluoromethylsulfonyl-2-nitro-1-aminobenzene in 4000 ml of 99 % ethanol in an autoclave, and the whole was hydrogenated for 10 hours at 60° – 70°C under a hydrogen pressure of about 100 atm/g. After cooling and release of the pressure, the ethanolic solution of the crude product was filtered off and concentrated to dryness with reduced pressure.

348 g (99 %) of 4-difluoro-methylsulfonyl-1,2-diaminobenzene were obtained, a product sufficiently pure for the subsequent reaction.

Melting point (from toluene) 128° –129°C.

g. 2-trifluoromethyl-5-difluoro-methylsulfonyl-benzimidazole

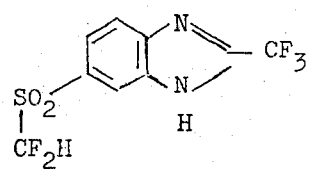

199 g (0.9 mole) of 1,2-diamino-4-difluoromethylsulfonylbenzene were refluxed for about 3 hours (bath temperature 110°C) with 308 g (2.7 moles) of trifluoroacetic acid. Subsequently, the trifluoroacetic acid in excess was distilled off together with the water formed, finally under reduced pressure. The remaining solid residue was recrystallized from acetonitrile.

Net yield 233 g (81.5 %), melting point 180° – 182°C.

TABLE

Physical data of the preliminary products obtained according to Example 1a to 1f

| Structure | R = H | CF$_2$H | CFClH |
|---|---|---|---|
| 4-Cl-C$_6$H$_4$-SH | | | |
| 4-Cl-C$_6$H$_4$-S-CF$_2$R | boiling point 94–96°C (16–17 mm) | — | b.p. 94–96°C (1.5– 1.6 mm) |
| 4-Cl-C$_6$H$_4$-SO$_2$-CF$_2$R | m.p. 67–68°C (benzene) | 42–43°C (crude) | 53–54°C (gasoline) |
| 4-Cl-3-NO$_2$-C$_6$H$_3$-SO$_2$-CF$_2$R | m.p. 72–74°C (methanol) | 56–57°C (ethanol) | 83°C (ethanol) |
| 4-NH$_2$-3-NO$_2$-C$_6$H$_3$-SO$_2$-CF$_2$R | m.p. 168–169°C (ethanol) | 117–118°C (ethanol) | 126–127°C (ethanol) |
| 4-NH$_2$-3-NH$_2$-C$_6$H$_3$-SO$_2$-CF$_2$R | m.p. 128–129°C (cyclohexane) | 56–57°C (crude) | 87–88°C (toluene) |

EXAMPLE 2

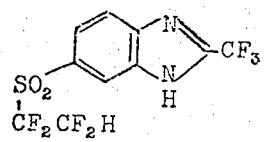

46 g (0.15 mole) of 1,2-diamino-4-tetrafluoro-ethylsulfonylbenzene were refluxed for about 3 hours (bath temperature about 100°–110°C) with 23 g (0.2 mole) of trifluoro-acetic acid. Subsequently, the excess trifluoro-acetic acid was distilled off together with the water formed during the cyclization (at last with reduced pressure). The remaining residue was recrystallized from chloroform.

Net yield: 35 g, m.p. 109° – 111°C

EXAMPLE 3

60 g (0.2 mole) of 1,2-diamino-4-(1′,1′,2′-trifluoro-2′-chloro)-ethylsulfonylbenzene were refluxed for about 1 hour (bath temperature 100° – 110°C) with 69 g (0.3 mole) of trifluoro-acetic acid. Subsequently, the non-consumed trifluoro-acetic acid was distilled off together with the water formed during the cyclization, at last under reduced pressure. The crude product remaining as residue was recrystallized from chloroform.

Net yield: 46.5 g, m.p. 112° – 114°C

EXAMPLE 4

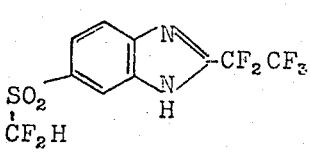

55 g (0.25 mole) of 1,2-diamino-4-difluoromethylsulfonylbenzene were heated for about 8 hours at about 110°C (bath temperature) with 82 g (0.5 mole) of pentafluoropropionic acid. The residue remaining in vacuo after having distilled off the mixture from excess pentafluoropropionic acid and water was digested with water until solidification. The crystalline crude product was collected on a suction filter and washed to neutral with a large amount of water. The crude product was suction-filtered and recrystallized from tetrahydrofuran.

Net yield: 31 g, m.p. 196° – 198°C

EXAMPLE 5

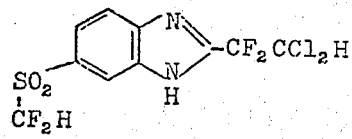

33.3 g (0.15 mole) of 1,2-diamino-4-difluoromethylsulfonylbenzene were dissolved in 100 ml of glacial acetic acid and, after addition of 29 g (0.15 mole) of 1,1-difluoro-2,2-dichloroiminopropionic acid methyl ester, heated for about 3.5 hours at 60° – 70°C (internal temperature). After cooling, the reaction mixture was digested several times with icewater. The crude product remaining as water-insoluble residue was absorbed in chloroform, the chloroform solution was dried and concentrated. The residue crystallizing on trituration was recrystallized from chloroform.

Net yield: 32 g, m.p. 142° – 144°C

EXAMPLE 6

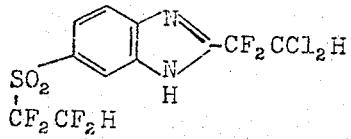

54 g (0.2 mole) of 1,2-diamino-4-(1′,1′,2′,2′-tetrafluoro)-ethylsulfonylbenzene were dissolved in 200 ml of glacial acetic acid, and, after addition of 42 g (0.22 mole) of 1,1-difluoro-2,2-dichloro-iminopropionic acid methyl ester, heated to 60° – 70°C (internal temperature). Subsequently, icewater was added to the cooled reaction mixture, the water decanted from the oily crude product precipitated and the product was several times digested with water. The viscous oil remaining was dissolved in methylene chloride, the solution was washed with water, dried over calcium chloride and concentrated. The oily residue solidified after a several hour standing at room temperature to form a mass of crystals, which was purified by intense dispersing by means of an Ultra-Turrax device in carbon tetrachloride in which the product is only scarcely soluble, and by subsequent suction-filtration of the fine crystals.

Net yield: 56 g, m.p. 89° – 95°C.

EXAMPLE 7

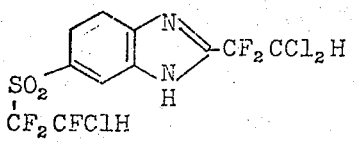

43.5 g (0.15 mole) of 1,2-diamino-4-(1′,1′,2′-trifluoro-2′-chloro)-ethylsulfonylbenzene were dissolved in 150 ml of glacial acetic acid and, after addition of 29 g (0.15 mole) of 1,1-difluoro-2,2-dichloro-imino-propionic acid methyl ester, heated for 3 hours at 60° – 70°C (internal temperature). Icewater was added to the cooled reaction mixture; the precipitated crude product, after decanting, was digested several times with water. The residue was absorbed in chloroform, the chloroform solution was washed with water, dried and concentrated. The crude product which resulted was recrystallized from carbon tetrachloride with addition of active charcoal.

Net yield: 57 g, m.p. 103° – 106°C.

EXAMPLE 8

A water-dispersible wettable powder was obtained by preliminary grinding
12 parts by weight of 3-trifluoromethyl-5-(6)difluoromethylsulfonyl-benzimidazole with
3 parts by weight of finely disperse silicic acid, then adding
43 parts by weight of a preliminary mixture containing
  10 g of cellulose pitch
  49 g of Sillitin Z$^{(R)}$ (quartz + Al-Silicate)
  8 g of finely disperse silicic acid 7 g of polypropylene oxide (molecular weight 750)/silicic acid 1:1
1 g of sodium salt of oleylmethyltauride,
mixing the whole and grinding it in a disk attrition mill.

EXAMPLES OF APPLICATION
EXAMPLE I

Seeds of weeds and crop plants were sowed in pots filled with loam earth and covered with flat covers. The day of sowing, the surface of the soil was sprayed with different doses of a wettable powder formulation of the active substance according to Example 1 g suspended in water. As somparative agents, 2 known benzimidazole derivatives were used, namely comparative agent A

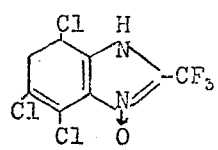 according to German Offenlegungsschrift No. 1.770.658 according to German Offenlegungsschrift No. 1.770.658 comparative agent B

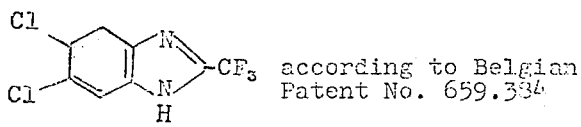 according to Belgian Patent No. 659.384 according to Belgian Pat. No. 659.384

The results of these treatments as well as the results of all following Examples were evaluated according to the following scheme of values:

| value index | % of damage in weeds | | | crop plants | | |
|---|---|---|---|---|---|---|
| 1 | | 100 | | | 0 | |
| 2 | 97,5 | to | <100 | 0 | to | 2,5 |
| 3 | 95 | to | <97,5 | >2,5 | to | 5 |
| 4 | 90 | to | <95 | >5 | to | 10 |
| 5 | 85 | to | <90 | >10 | to | 15 |
| 6 | 75 | to | <85 | >15 | to | 25 |
| 7 | 65 | to | <75 | >25 | to | 35 |
| 8 | 32,5 | to | <65 | >35 | to | 67,5 |
| 9 | 0 | to | <32,5 | >67,5 | to | 100 |

The index 4 indicates a degree of activity against weeds or an absence of detrimental effects in crop plants that is still acceptable (cf. Bolle, Nachrichtenblatt des Deutschen Pflanzenschutzdienstes 16, 1964, 92 – 94).

4 weeks after treatment the following results listed in Table I were obtained:

TABLE I

Greenhouse test, preemergence treatment; dosage in kg/ha of active substance

| plant species | active substance according to Example (1g) 1.25 | comparative agent A 1.25 | comparative agent B 1.25 |
|---|---|---|---|
| weeds: | | | |
| Anthemis | 1 | 8 | 8 |
| Avena | 1 | 9 | 9 |
| Echinochloa | 2 | 9 | 8 |
| Lolium | 1 | 9 | 9 |

TABLE I-Continued

Greenhouse test, preemergence treatment; dosage in kg/ha of active substance

| plant species | active substance according to Example (1g) 1.25 | comparative agent A 1.25 | comparative agent B 1.25 |
|---|---|---|---|
| Poa | 1 | 9 | 8 |
| Sinapis | 1 | 8 | 8 |
| Stellaria | 1 | 7 | 8 |
| Crop plants: | | | |
| peanut | 1 | 1 | 1 |
| cotton | 1 | 1 | 1 |

EXAMPLE II

A wettable powder formulation of the substance of the invention according to Example 1 g suspended in water was sprayed on weeds in the postemergence phase in a greenhouse. For comparative purposes the same known substances A and B were used. 4 weeks after the treatment, the following result was obtained:

TABLE II

Greenhouse test, postemergence treatment; dosages in kg/ha of active substance

| plant species | active substance according to Example (1g) | | comparative agent A | | comparative agent B | |
|---|---|---|---|---|---|---|
| | 0.62 | 0.31 | 0.62 | 0.31 | 0.62 | 0.31 |
| Lamium | 1 | 3 | 3 | 7 | 4 | 7 |
| Galium | 2 | 5 | 4 | 8 | 5 | 9 |
| Veronica | 2 | 4 | 4 | 6 | 5 | 8 |
| Viola | 1 | 1 | 1 | 5 | 2 | 7 |
| Stellaria | 1 | 1 | 3 | 4 | 5 | 9 |
| Matricaria | 1 | 1 | 2 | 7 | 5 | 8 |

EXAMPLE III

In a greenhouse test, the compound of Example 1g was compared with the known commercial product dinoseb acetate (2,4-dinitro-6-sec.-butylphenyl acetate). For this purpose, wettable powder formulations of both active substances were sprayed onto the emerged weeds in the 2 to 3-leaf stage. In the same manner barley and wheat were treated. 3 weeks after treatment the following result was obtained:

TABLE III

Greenhouse test, postemergence treatment; dosages in kg/ha of active substance

| plant species | active substance according to Example (1g) | | | dinoseb acetate | | |
|---|---|---|---|---|---|---|
| | 0.62 | 0.31 | 0.15 | 0.62 | 0.31 | 0.15 |
| Weed grasses: | | | | | | |
| Alopecurus | 2 | 7 | 9 | 8 | 9 | 9 |
| Apera | 1 | 3 | 6 | 8 | 8 | 9 |
| Bromus | 4 | 8 | 9 | 8 | 9 | 9 |
| Poa | 3 | 5 | 8 | 8 | 8 | 9 |
| Weeds: | | | | | | |
| Amaranthus | 1 | 1 | 1 | 5 | 7 | 8 |
| Anthemis | 1 | 1 | 1 | 1 | 3 | 6 |
| Chenopodium | 1 | 1 | 1 | 1 | 1 | 1 |
| Chrysanthemum | 1 | 1 | 1 | 1 | 3 | 5 |
| Galium | 3 | 4 | 8 | 8 | 9 | 9 |
| Matricaria | 1 | 1 | 1 | 1 | 4 | 7 |

TABLE III-Continued

Greenhouse test, postemergence treatment: dosages in kg/ha of active substance

| plant species | active substance according to Example (1g) | | | dinoseb acetate | | |
|---|---|---|---|---|---|---|
| | 0.62 | 0.31 | 0.15 | 0.62 | 0.31 | 0.15 |
| Sinapis | 1 | 2 | 5 | 1 | 5 | 7 |
| Stellaria | 1 | 1 | 3 | 5 | 6 | 8 |
| Viola | 1 | 1 | 1 | 7 | 8 | 9 |
| Crop plants: | | | | | | |
| barley | 1 | 1 | 1 | 1 | 1 | 1 |
| wheat | 1 | 1 | 1 | 1 | 1 | 1 |

EXAMPLE IV

In a similar greenhouse test the substance of Example 1g was compared with dinoseb acetate and bromofenoxim (3,5-dibromo-4-hydroxy-benzaldoxime-0-2',4'-dinitrophenyl-ether) with respect to its activity against Galium. 3 weeks after treatment, the following result was obtained:

TABLE IV

Greenhouse test, postemergence treatment; dosages in kg/ha of active substance

| plant species | active substance according to Example (1g) | | | dinoseb-acetate | | | bromofenoxim | | |
|---|---|---|---|---|---|---|---|---|---|
| | 2.5 | 1.25 | 0.62 | 2.5 | 1.25 | 0.62 | 2.5 | 1.25 | 0.62 |
| Weed: | | | | | | | | | |
| Galium | 1 | 1 | 4 | 2 | 7 | 8 | 2 | 5 | 7 |
| Crop plant: | | | | | | | | | |
| wheat | 2 | 1 | 1 | 4 | 1 | 1 | 1 | 1 | 1 |

EXAMPLE V

Solutions of the substance of Example 1g and of several commercial products were sprayed on a freshly sowed lawn heavily infested with Stellaria. The result is listed in the following Table V:

TABLE V

Field test, postemergence treatment; dosages in kg/ha of active substance

| plant species | active substance according to Example (1g) | ioxyn 1 | dinoseb-acetate | bromofenoxim |
|---|---|---|---|---|
| | 1.0 | 1.0 | 2.0 | 2.0 |
| Weed: | | | | |
| Stellaria | 2 | 5 | 6 | 6 |
| Crop plant | | | | |
| Lawn (freshly sowed) | 1 | 1 | 1 | |

EXAMPLE VI

In a greenhouse test, seeds of various weeds were sowed in pots. Simultaneously, potatoe tubers were planted in pots. The same day, a wettable powder suspension of the substance of Example 1g was sprayed on the surface of the soil. As comparative agent, the commercial product monolinuron (N-4-chlorophenyl-N'-methyl-N'-methoxy-urea) was used. 5 weeks after treatment, the following result was obtained:

TABLE VI

Greenhouse test, preemergence treatment; dosages in kg/ha of active substance

| plant species | active substance according to Example (1g) | | monolinuron | |
|---|---|---|---|---|
| | 2.5 | 0.62 | 2.5 | 0.62 |
| Weeds | | | | |
| Poa | 1 | 3 | 1 | 2 |
| Sinapis | 1 | 1 | 1 | 1 |
| Polygonum | 1 | 1 | 1 | 1 |
| Stellaria | 1 | 1 | 1 | 1 |
| Chenopodium | 1 | 1 | 1 | 1 |
| Matricaria | 1 | 1 | 1 | 3 |
| Crop plant | | | | |
| potatoe | 1 | 1 | 6 | 2 |

EXAMPLE VII

In a field test using corn, the substance of Example 1g was compared with the commercial product atrazine (2-chloro-4-ethylamino-6-isopropylamino-1,3,5-triazine). For this purpose, both active substances after the crop plant had been sowed, were sprayed on separate areas each measuring 10 m². The result is listed in the following Table VII:

TABLE VII

Field test, preemergence treatment; dosages in kg/ha of active substance

| plant species | active substance according to Example (1g) | atrazine |
|---|---|---|
| | 2.0 | 2.0 |
| Weeds: | | |
| Echinochloa | 2 | 6 |

TABLE VII-Continued

Field test, preemergence treatment; dosages in kg/ha of active substance

| plant species | active substance according to Example (1g) 2.0 | atrazine 2.0 |
|---|---|---|
| Digitaria | 1 | 7 |
| dicotylous species*) | 1 | 1 |
| crop plant: | | |
| CORN | 1 | 1 |

*)dicotylous species: mixture of Sinapis, Senecio, Stellaria, Veronica and Lamium

EXAMPLE VIII

Wettable powder formulations of the compounds of Examples 3, 4 and 2 and of several commercial products were suspended in water and sprayed on weeds in the pre- and post-emergent phase. The result is listed in the following Table VIII:

TABLE VIII

Greenhouse tests
pre = preemergence treatment
post = postemergence treatment
dosages in kg/ha of active substance

| plant species | pre active substance according to Examples | | | post active substance according to Examples | | |
|---|---|---|---|---|---|---|
| | 3 2.5 | 4 2.5 | 2 2.5 | 3 5.0 | 4 5.0 | 2 5.0 |
| Impomoea | 3 | 1 | 4 | 5 | 5 | 4 |
| Sinapis | 1 | 1 | 1 | 1 | 3 | 3 |
| Anthemis | 1 | 1 | 3 | 1 | 1 | 2 |
| Amaranthus | 3 | 1 | 2 | 4 | 1 | 3 |
| Chenopodium | 5 | 1 | 2 | 5 | 1 | 3 |
| Mercurialis | 6 | 3 | 3 | 4 | 4 | 2 |
| Stellaria | — | — | — | 1 | 1 | 1 |

EXAMPLES IX TO XI

In a field test (spring treatment, post-emergent application), the substance of Example 1g was compared with the commercial products dinoseb acetate and bromofenoxim with respect to its activity in winter rye, winter barley, spring barley, spring wheat and oats using 3 different application concentrations. 15 to 20 days after the treatment, the results listed in Tables IX, X and XI were obtained.

TABLE IX

Field test, post-emergence treatment

| Product application amount in kg/ha of active substance | | Winter rye | Lamium purpureum | Matricaria chamomilla | Veronica hederaefolia | Viola tricolor | Stellaria media |
|---|---|---|---|---|---|---|---|
| untreated | | 1 | 9 | 9 | 9 | 9 | 9 |
| dinoseb | 2.0 | 1 | 7 | 7 | 8 | 9 | 5 |
| acetate | 1.0 | 1 | 8 | 8 | 9 | 9 | 6 |
| | 0.5 | 1 | 9 | 9 | 9 | 9 | 6 |
| bromo- | 2.0 | 1 | 1 | 1 | 1 | 1 | 3 |
| fenoxim | 1.0 | 1 | 1 | 1 | 2 | 3 | 5 |
| | 0.5 | 1 | 2 | 1 | 3 | 5 | 5 |
| active substance acc. to Example (1g) | 2.0 | 1 | 1 | 1 | 1 | 1 | 1 |
| | 1.0 | 1 | 1 | 1 | 1 | 1 | 1 |
| | 0.5 | 1 | 1 | 1 | 2 | 1 | 2 |

TABLE X

Field test, post emergence treatment

| Product application amount in kg/ha of active substance | | Winter barley | Lamium purpureum | Matricaria chamomilla | Veronica hederaefolia | Viola tricolor | Stellaria media |
|---|---|---|---|---|---|---|---|
| untreated | | 1 | 9 | 9 | 9 | 9 | 9 |
| dinoseb | 2.0 | 1 | 2 | 7 | 8 | 9 | 5 |
| acetate | 1.0 | 1 | 3 | 8 | 9 | 9 | 6 |
| | 0.5 | 1 | 6 | 9 | 9 | 9 | 8 |
| bromo- | 2.0 | 1 | 2 | 4 | 5 | 9 | 6 |
| fenoxim | 1.0 | 1 | 3 | 5 | 8 | 9 | 7 |
| | 0.5 | 1 | 3 | 6 | 9 | 9 | 8 |
| active substance acc. to Example (1g) | 2.0 | 1 | 1 | 4 | 3 | 1 | 3 |
| | 1.0 | 1 | 1 | 5 | 4 | 1 | 3 |
| | 0.5 | 1 | 1 | 5 | 4 | 2 | 4 |

TABLE XI

Field test, post-emergence treatment

| Product application amount in kg/ha of active substance | | spring barley | wheat | oats | Galium aparine | Mercurialis annua | Polygon. convolvulus | Veronica persica |
|---|---|---|---|---|---|---|---|---|
| untreated | | 1 | 1 | 1 | 9 | 9 | 9 | 9 |
| dinoseb | 2.0 | 1 | 1 | 1 | 3 | 7 | 8 | 9 |
| acetate | 1.0 | 1 | 1 | 1 | 6 | 8 | 9 | 9 |
|  | 0.5 | 1 | 1 | 1 | 9 | 9 | 9 | 9 |
| bromo- | 2.0 | 1 | 1 | 1 | 1 | 3 | 1 | 2 |
| fenoxim | 1.0 | 1 | 1 | 1 | 2 | 3 | 1 | 2 |
|  | 0.5 | 1 | 1 | 1 | 3 | 3 | 2 | 3 |
| active substance acc. to | 2.0 | 1 | 1 | 1 | 1 | 1 | 1 | 1 |
| Example | 1.0 | 1 | 1 | 1 | 2 | 1 | 1 | 1 |
| (Ig) | 0.5 | 1 | 1 | 1 | 2 | 2 | 1 | 2 |

We claim:
1. A benzimidazole derivative of the formula

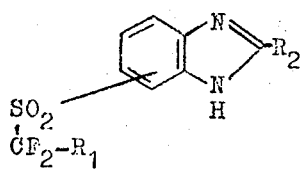

where $R_1$ is H, $-CF_2H$, $-CFClH$ or $-CCl_2H$ and $R_2$ is haloalkyl having 1 or 2 carbon atoms.

2. 2-trifluoromethyl-5-difluoro-methylsulfonyl-benzimidazole.

* * * * *